US005730528A

United States Patent [19]

Allison et al.

[11] Patent Number: 5,730,528

[45] Date of Patent: Mar. 24, 1998

[54] HIGH TEMPERATURE THERMOMETRIC PHOSPHORS FOR USE IN A TEMPERATURE SENSOR

[75] Inventors: Stephen W. Allison, Knoxville; Michael R. Cates; Lynn A. Boatner, both of Oak Ridge, all of Tenn.; George T. Gillies, Earlysville, Va.

[73] Assignee: Lockheed Martin Energy Systems, Inc., Oak Ridge, Tenn.

[21] Appl. No.: 704,052

[22] Filed: Aug. 28, 1996

[51] Int. Cl.$^6$ .................... G01K 11/20

[52] U.S. Cl. .................... 374/161; 250/459.14; 250/461.1

[58] Field of Search .................... 374/161, 120, 374/159; 250/458.1, 459.1, 461.1

[56] References Cited

U.S. PATENT DOCUMENTS

| | | | |
|---|---|---|---|
| 4,215,275 | 7/1980 | Wickersheim | 374/159 |
| 4,592,664 | 6/1986 | Bijlenga et al. | 374/131 |
| 4,729,668 | 3/1988 | Angel et al. | 374/161 |
| 4,759,033 | 7/1988 | Ariessohn | 374/161 |
| 4,768,886 | 9/1988 | Hirschfeld et al. | 374/161 |
| 4,776,827 | 10/1988 | Greaves | 374/161 |
| 5,332,316 | 7/1994 | Kleinerman | 374/161 |

FOREIGN PATENT DOCUMENTS

| | | | |
|---|---|---|---|
| 0007530 | 1/1983 | Japan | 374/161 |

OTHER PUBLICATIONS

M. M. Abraham, L. A. Boatner, T. C. Quinby, D. K. Thomas, and M. Rappaz, "Preparation and Compaction of Synthetic Monazite Powders," *Radioactive Waste Management*, vol. 1(2), Sep. 1980, pp. 181–191.

M. Petek, M. M. Abraham, and L. A. Boatner, "Lanthanide Orthophosphates as a Matrix for Solidified Radioactive Defense and Reactor Wastes," *The Scientific Basis for Nuclear Waste Management*, Stephen V. Tapp, Ed., Copyright 1982 by Elsevier Science Publishing Company, Inc.

S. W. Allison, L. A. Boatner, and G. T. Gillies, "Characterization of high–temperature thermographic phosphors: spectral properties of $LuPO_4$:Dy(1%), Eu(2%)," *Applied Optics*, vol. 34, No. 25, Sep. 1, 1995, pp. 5624–5627.

M. M. Abraham, L. A. Boatner, and J. O. Ramey, "The observation by EPR of trivalent hafnium in $LuPO_4$, $YPO_4$, and $ScPO_4$," *J. Chem. Phys.* 83(6), Sep. 15, 1985, pp. 2754–2758.

N. N. Morozov, N. B. Vasil'eva, V. P. Orlovskii, N. A. Dzhabishvili, and L. N. Kargareteli, "IR Absorption Spectra of Lutecium Orthophosphate Activated by $Nd^{3+}$, $Eu^{3+}$, and $Er^{3+}$," N. S. Kurnakov Institute of General and Inorganic Chemistry, Academy of Sciences of the USSR; translated from Izvestiya Akademii Nauk SSSR, Neorganicheskie Materialy, vol. 17, No. 6, Jun. 1981, pp. 1053–1057; 1981 Plenum Publishing Corporation, pp. 768–772.

(List continued on next page.)

*Primary Examiner*—Diego F.F. Gutierrez
*Attorney, Agent, or Firm*—Ivan L. Ericson

[57] ABSTRACT

A high temperature phosphor consists essentially of a material having the general formula $LuPO_4$:$Dy_{(x)}$,$Eu_{(y)}$, wherein: 0.1 wt %≦x≦20 wt % and 0.1 wt %≦y≦20 wt %. The high temperature phosphor is in contact with an article whose temperature is to be determined. The article having the phosphor in contact with it is placed in the environment for which the temperature of the article is to be determined. The phosphor is excited by a laser causing the phosphor to fluoresce. The emission from the phosphor is optically focused into a beam-splitting mirror which separates the emission into two separate emissions, the emission caused by the dysprosium dopant and the emission caused by the europium dopent. The separated emissions are optically filtered and the intensities of the emission are detected and measured. The ratio of the intensity of each emission is determined and the temperature of the article is calculated from the ratio of the intensities of the separate emissions.

10 Claims, 2 Drawing Sheets

OTHER PUBLICATIONS

G. M. Begun, G. W. Beall, L. A. Boatner, and W. J. Gregor, "Raman Spectra of the Rare Earth Orthophosphates," *Journal of Raman Spectroscopy*, vol. 11, No. 4, 1981, pp. 273–278.

A. R. Bugos, S. W. Allison, and M. R. Cates, "Emission Properties of Europium–Doped Lanthanum and Lutetium Orthosphosphate Crystals for Use in High Temperature Sensor Applications," *Proceedings of the Southeastcon '89 Conference on Energy and Information Technologies in the Southeast*, Columbia, South Carolina, Apr. 9–12, 1989, pp. 361–365.

HIGH TEMPERATURE THERMOMETRIC PHOSPHORS FOR USE IN A TEMPERATURE SENSOR

This invention was made with Government support under contract DE-AC05-84OR21400 awarded by the U.S. Department of Energy to Lockheed Martin Energy Systems, Inc. and the Government has certain rights in this Invention.

FIELD OF THE INVENTION

The present invention relates to a thermometric phosphor and a method of measuring temperature using the phosphor, more particularly, to a high temperature $LuPO_4$:Dy,Eu phosphor and a method of measuring temperature using the phosphor.

BACKGROUND OF THE INVENTION

In the temperature range lying above approximately 800° C., measurements of the temperature of objects in a remote, non-contact, manner or on moving parts (or both) is very difficult. The measurement of such high temperatures by a remote method is often carried out by so-called pyrometric techniques in which the effective "color" of the light emitted from the hot object to be measured is compared to that produced by an externally heated wire or other object whose temperature can be varied in a controlled manner and whose optical emission can be calibrated as a function of temperature. This method suffers from a number of shortcomings including errors which arise due to thermally induced changes in the emissivity of the object whose temperature is to be measured, background reflections or interference, and in some cases, to the deposition of partially transmitting films on windows which may be interposed between the pyrometer and the object. In the case of temperature measurements on moving parts, direct (i.e. non-remote) traditional temperature measurement techniques involving resistive thermometry or thermocouples require electrical contacts which necessitate the use of commutators. The attachment of such devices is not always practical or possible, and in any event, their use can introduce electrical noise and errors in the temperature determination. Additionally, thermocouples are subject to degradation and to calibration drift. The subject invention overcomes these problems by employing an inert "thermophosphor" whose fluorescence properties are temperature dependent but whose optical emission is independent of emissivity. Such a thermophosphor can be interrogated in a remote manner (i.e. without the use of direct electrical contacts) and can be interrogated on rapidly moving parts without the use of commutators.

OBJECTS OF THE INVENTION

Accordingly, it is an object of the present invention to provide a high temperature thermometric phosphor and a method of measuring temperatures utilizing the phosphor. Further and other objects of the present invention will become apparent from the description contained herein.

SUMMARY OF THE INVENTION

In accordance with one aspect of the present invention, a new and improved high temperature phosphor consists essentially of a material having the general formula $$LuPO_4{:}Dy_{(x)},Eu_{(y)},$$

wherein:

$0.1 \text{ wt } \% \leqq x \leqq 20 \text{ wt } \%$ $0.1 \text{ wt } \% \leqq y \leqq 20 \text{ wt } \%$ In accordance with another aspect of the present invention, a new and improved high temperature measuring system comprises a lutetium phosphate dysprosium and europium-activated phosphor has a phosphor fluorescence emission comprising a dysprosium fluorescence emission and an europium fluorescence emission, a phosphor excitation means having an excitation emission, an optical focusing means for focusing a phosphor fluorescence emission to a phosphor fluorescence emission separation means, a first filter, a second filter, a first detection means, a second detection means, an analyzing means, a first electrical connecting means and a second electrical connecting means. The first filter is for filtering the separated europium fluorescence emission to form a filtered separated europium fluorescence emission. The second filter is for filtering the separated dysprosium fluorescence emission to form a filtered separated dysprosium fluorescence emission. The phosphor fluorescence emission separation means separates the dysprosium fluorescence emission contained in the phosphor fluorescence emission from the europium fluorescence emission contained in the phosphor fluorescence emission to form a separated dysprosium fluorescence emission and a separated europium fluorescence emission. The analyzing means is in electrical communication with the first detection means and the second detection means The excitation emission of the phosphor excitation means is in optical communication with the lutetium phosphate, dysprosium and europium-activated phosphor. The phosphor fluorescence emission is in optical communication with the optical focusing means. The focused phosphor fluorescence emission is in optical communication with the phosphor fluorescence emission separation means. The separated europium fluorescence emission is in optical communication with the first filtering means. The separated dysprosium fluorescence emission is in optical communication with the second filtering means. The filtered separated europium fluorescence emission is in optical communication with the first detection means and the filtered separated dysprosium fluorescence emission is in optical communication with the second detection means.

In accordance with another aspect of the present invention, a new and improved method for measuring a temperature of an article comprises the following steps:

Step 1. An article coated with a lutetium phosphate, dysprosium and europium-activated phosphor is provided.

Step 2. The lutetium phosphate, dysprosium and europium-activated phosphor is excited with a phosphor excitation means causing the lutetium phosphate, dysprosium, europium activated phosphor to fluoresce a phosphor fluorescence emission comprising a dysprosium fluorescence emission and a europium fluorescence emission.

Step 3. The phosphor fluorescence emission is optically focused by a optical focusing means and is in optical communication with a phosphor fluorescence emission separation means.

Step 4. The dysprosium fluorescence emission and the europium fluorescence emission of the phosphor fluorescence emission are separated by the phosphor fluorescence emission separation means forming a separate dysprosium fluorescence emission having a wavelength and an intensity and a separate europium fluorescence emission having a wavelength and an intensity.

Step 5. The separate dysprosium fluorescence emission is filtered with a first filtering means, and the separate europium fluorescence emission is filtered with a second filtering means forming a filtered dysprosium fluorescence emission and a filtered europium fluorescence emission.

Step 6. The intensity of the filtered dysprosium fluorescence emission is detected with a first detection means and the intensity of the filtered europium fluorescence emission is detected with a second detection means.

Step 7. The ratio of the intensity of the filtered dysprosium fluorescence emission and the intensity of the filtered europium fluorescence emission is calculated by an analyzer means.

Step 8. The temperature of the article is determined from the calculated ratio of the intensity of the filtered dysprosium fluorescence emission and the intensity of the filtered europium fluorescence emission by the analyzer means.

Figure 1:
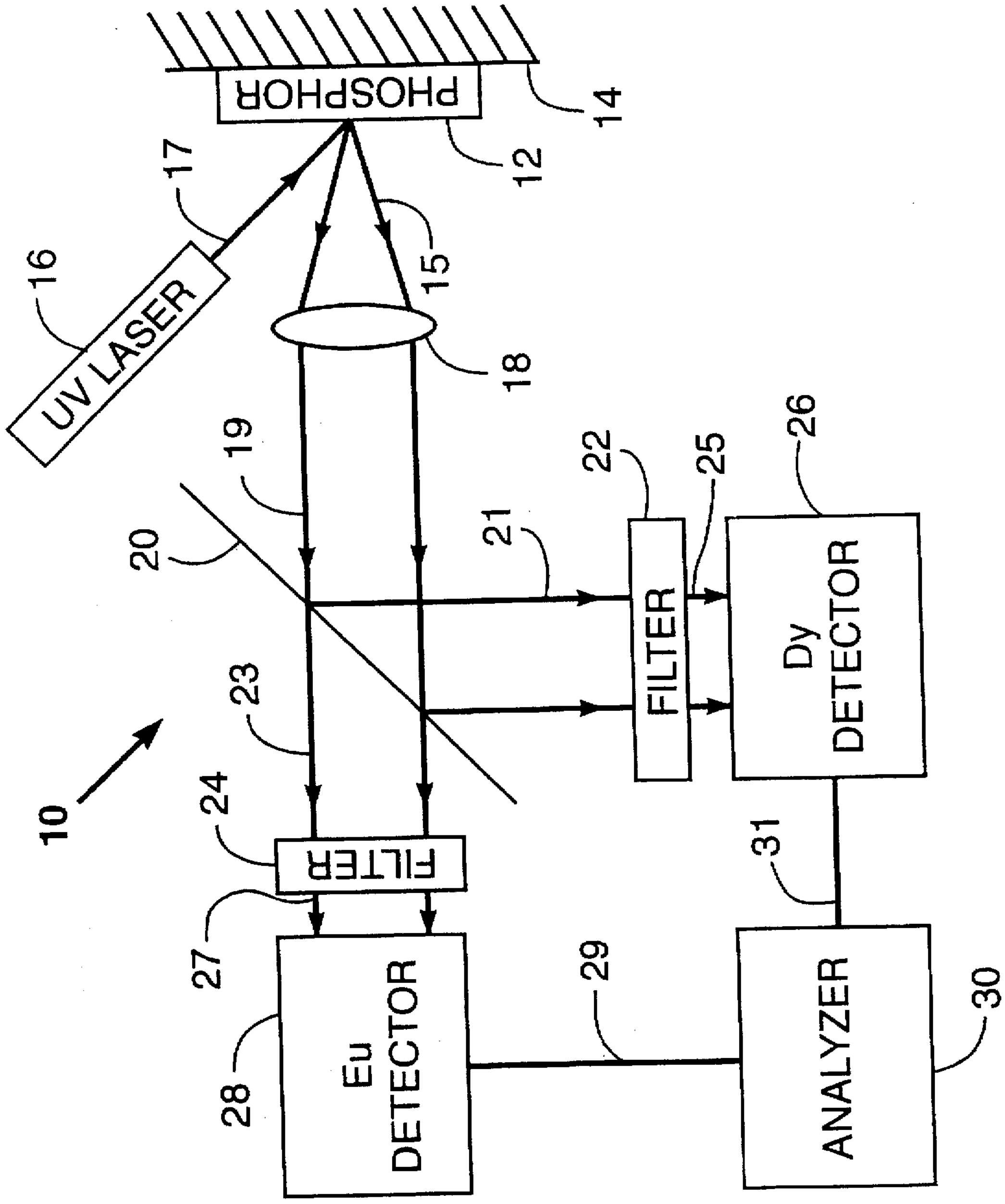
FIG. 1 is a schematic drawing of a temperature measuring system in accordance with the present invention.

For a better understanding of the present invention, together with other and further objects, advantages and capabilities thereof, reference is made to the following disclosure and appended claims in connection with the above described drawings.

DETAILED DESCRIPTION OF THE PREFERRED EMBODIMENTS

The present invention represents the first known or reported use of a thermographic phosphor in which two distinct activator dopants are employed and which act in concert win carrying out remote temperature measurements. This doubly doped thermophosphor has the advantage of increasing the number of emission wavelengths from which to select operating conditions. By controlling the excitation wavelength, fluorescence from either Dy or Eu may be independently selected. Additionally, a ratio of the various lines for the doubly doped $LuPO_4$ host system can be exploited to photo-optically measure temperatures over a very wide and practical range. Measurable fluorescence from Eu in $LuPO_4$ can be obtained up to 1,200° C. and measurable fluorescence can be obtained from Dy in $LuPO_4$ up to at least 1350° C. In particular, this new thermographic phosphor is well suited to use with a Nd:YAG laser since the europium dopant can be excited with the fourth harmonic of this laser at 266 nm while the dysprosium dopant can be independently excited with the third harmonic of the laser at 355 nm. Additionally, a XeF laser can be used to excite the Dy ion by using the 351 nm line of this laser. Other laser excitation sources such as a tunable dye laser can be used as well as conventional UV sources. Additionally, the $LuPO_4$ host material has the advantages of being thermally stable up to 1900° C., and the material is also chemically very stable in the presence of both high- and low-pH environments. Additionally, at temperatures above about 350° C., $LuPO_4$ is very resistant to radiation damage effects due to displacive radiation or ionizing radiation. The thermographic phosphor material can be readily synthesized in powder or bulk ceramic form by using techniques which were originally developed for the formation of nuclear waste disposal media. In the case of the formation of bulk ceramics of $LuPO_4$:Dy,Eu, dense ceramic bodies can be formed either by conventional cold pressing and sintering or by hot pressing methods. Additionally, the material can be produced in single crystal form by means of established crystal growth techniques.

The basis of the subject invention is a new optical thermophosphor which exhibits unique spectral characteristics that are temperature dependent and where variations in the laser stimulated fluorescence output of the material can be calibrated for temperature-measurement applications. In particular, the new thermophosphor material is based on the concept of the incorporation of more than one optically active ionic species in a host material that is highly stable at elevated temperatures and under a variety of environmental conditions (e.g. under various redox conditions arising from ambient atmospheres). By combining the spectral properties of the two rare-earth ionic-dopant species employed in the subject invention (i.e. Dy and Eu), it is possible to obtain ratios of the outputs and lifetimes of the various fluorescence lines and, thereby, to photo-optically measure temperatures over an extended temperature range which, based on existing results, should extend to elevated temperatures in excess of 1350° C.

The phosphor is, for the case of the present subject invention, a lutetium orthophosphate host ($LuPO_4$) doped with nominally 1.0 at. % Dy and 2.0 at. % Eu. In general practice of the subject invention, however, the range of concentration of the two dopant ions, Dy and Eu, may be varied in order to adjust the fluorescence lifetimes and other properties of the laser-stimulated optical output. Depending on the specific application and the required optical fluorescence properties, the Dy and Eu concentration ranges may, in fact, be independently varied in the region extending from about 0.1 at. % to about 20 at. % for each dopant ion. It is important to note that the thermophosphor consisting of an $LuPO_4$ host double doped with Dy and Eu can be made in either the form of a single crystal, a polycrystalline powder which may be applied as a coating to the material whose temperature is to be measured, or in the form of a polycrystalline sintered ceramic. In the case of a thermophosphor sensor fabricated as a sintered polycrystalline ceramic, the thermophosphor sensor element may be fabricated in a wide range of shapes, sizes, and configurations in order to mate with a variety of parts whose temperature is to be determined. This fabrication can be achieved using the previously established sintering characteristics of the lanthanide orthophosphates [For data relating to the sintering properties of the lanthanide orthophosphates, see: "Lanthanide Orthophosphates as a Matrix for Solidified Radioactive Defense and Reactor Wastes" by M. Petek, M. M. Abraham, and L. A. Boatner, in The Scientific Basis for Nuclear Waste Management, Stephen V. Topp, Editor, (Elsevier Science Publishing Co., Inc. 1982) pp 181–186.)] and is incorporated herein by reference thereto.

Single crystals of $LuPO_4$:Dy(1 at. %),Eu(2 at. %) were grown using a flux method, in covered platinum crucibles containing 3.5 g of $Lu_2O_3$, 0.0626 g of $EU_2O_3$, 0.037 g $Dy_2O_3$ and 60 g of lead pyrophosphate, $PbHPO_4$ as the flux matrix. The materials were heated for 16 hours at approximately 1360° C. The crucibles where cooled at a rate of 1° C./hour to 900° C. and then, cooled directly to room temperature. The flux material was then dissolved in boiling nitric acid to remove from the matrix the single crystals of the tertiary solid solution of $LuPO_4$:Dy(1 at. %),Eu(2 at. %) phosphor.

Polycrystalline powder of $LuPO_4$:Dy(1 at. %),Eu(2 at. %) was made by dissolving the oxide form of lutetium, dysprosium and europium in a hot nitric acid solution. A stoichiometric amount of ammonium hydrogen phosphate $(NH_2)HPO_4$ is then added to the solution and the lutetium orthophosphate doped with dysprosium and europium is formed by metathesis. At this point, granular urea is added and the mixture is heated at 180° C. until precipitation occurs. Further heating at 400° C. results in a partial release of water vapor, nitrogen, ammonia, hydrogen, and carbon dioxide. Following this step the powder is transferred to an alumina crucible for a complete calcination at 800° C. to form a powder of $LuPO_4$:Dy(1 at. %),Eu(2 at. %).

Shown in FIG. 1 is high temperature measuring system 10. High temperature measuring system 10 comprises lutetium phosphate, dysprosium and europium-activated phosphor 12 coated on article 14, such as components of a turbine engine, a reciprocating engine, a reactor or any part used in high temperature applications, phosphor excitation means 16, such as a Nd:YAG excitation laser, a XeF excimer laser, or any other pulsed laser, excitation emission 17, such as 266 nm and 355 nm, of phosphor excitation means 16, phosphor fluorescence emission 15, including 484 nm and 575 nm dysprosium lines and 595 nm europium line, optical focusing means 18, such as an optical lens or focusing mirrors or combinations thereof, focused phosphor fluorescence emission 19, phosphor fluorescence emission separation means 20, such as a dichroic beam-splitting mirror, separated first emission 21 containing a 595 nm europium line, if any, separated second emission 23 containing a 484 nm and 575 nm dysprosium lines, if any, first emission filtering means 22, such as a narrow band optical filter, a prism monochromator, a grating monochromator, or an interference optical filter or combinations thereof, filtered first emission 25 containing essentially the 595 nm europium line, if any, second emission filtering means 24, such as a narrow band optical filter, a prism monochromator, a grating monochromator, or an interference optical filter, filtered second emission 27 containing essentially the 484 nm and 575 nm dysprosium lines, if any, first detection means 26, such as a photo multiplier or photo diode detector, second detection means 28, such as a photomultiplier or photo diode detector, analyzing means 30, first electrical connecting means 29, such as an electrical cable or wire, electrically connecting second detection means 28 and analyzing means 30, such as a digital oscilloscope coupled to a computer, and second electrical connecting means 31, such as an electrical cable or wire, electrically connecting first detection means 26 and analyzing means 30. Excitation emission 17 of phosphor excitation means 16 is in optical communication with lutetium phosphate, dysprosium and europium-activated phosphor 12. Phosphor fluorescence emission 15 is in optical communication with optical focusing means 18. Focused phosphor fluorescence emission 19 is in optical communication with phosphor fluorescence emission separation means 20. Separated europium fluorescence emission 21 is in optical communication with first filtering means 22. Separated dysprosium fluorescence emission 23 is in optical communication with second emission filtering means 24. Filtered separated europium fluorescence emission 25 is in optical communication with first detection means 26. Filtered separated dysprosium fluorescence emission 27 is in optical communication with second detection means 28.

Measuring the temperature of article 14 comprises the following steps:

Step 1. Article 14 coated with lutetium phosphate, dysprosium and europium-activated phosphor 12 is provided.

Step 2. Lutetium phosphate, dysprosium and europium-activated phosphor 12 is activated with phosphor excitation means 16 causing lutetium phosphate dysprosium and europium-activated phosphor 12 to fluoresce phosphor fluorescence emission 15 comprising a dysprosium fluorescence emission and an europium fluorescence emission.

Step 3. Phosphor fluorescence emission 15 is optically focused by optical focusing means 18 and is in communication with phosphor fluorescence emission separation means 20.

Step 4. Dysprosium fluorescence emission and europium fluorescence emission 21 of phosphor fluorescence emission 15 are separated by phosphor fluorescence emission separating means 20 forming separate dysprosium fluorescence emission 23 having a wavelength and an intensity and separate europium fluorescence emission 21 having a wavelength and an intensity.

Step 5. Separate dysprosium fluorescence emission 23 is filtered with first filtering means 22, such as a narrow band wide filter, and separate europium fluorescence emission 21 is filtered with second filtering means 24, such as a narrow band wide filter, forming filtered dysprosium emission 25 and filtered europium emission 27.

Step 6. The intensity of filtered dysprosium fluorescence emission 23 is detected with first detection means 26 and the intensity of filtered europium fluorescence emission 21 is detected with second detection means 28.

Step 7. The ratio of the intensity of filtered dysprosium fluorescence emission 23 and the intensity of filtered europium fluorescence emission 21 is calculated by analyzer means 30.

Step 8. The temperature of article 14 is determined from the calculated ratio of the intensity of filtered dysprosium fluorescence emission 23 and the intensity of filtered europium fluorescence emission 21 by analyzer means 30.

In addition to a lutetium phosphate, dysprosium, europium activated phosphor, yttrium phosphate, dysprosium and europium-activated phosphor, $YPO_4:Dy_{(x)},Eu_{(y)}$, and scandium phosphate, dysprosium and europium-activated phosphor, $ScPO_4:Dy_{(x)},Eu_{(y)}$, can be used in the high temperature measuring system.

In the practical embodiment of the invention, however, the thermophosphor and part may represent components of, for example, a turbine engine, a reciprocating engine, a nuclear reactor, or a furnace for the processing of ceramic components or for the melting and/or fabrication of metals, alloys, or glasses or of any other source of heat which may be employed in either transportation or materials synthesis and processing applications or in research and development applications. In the embodiment of the invention shown in the figure, a test configuration is illustrated which also represents a configuration which could be employed for the calibration of the thermophosphor either individually or in contact with a test piece. One embodiment of the invention, a pulse generator can provide a trigger signal which actuates a pulsed laser. This laser may be, for example, a Nd:YAG excitation laser, a XeF excimer laser, or any other pulsed laser evident to those skilled in the art as being appropriate to the excitation of the fluorescent energy levels of the Dy and Eu dopant ions. The use of, for example, a Nd:YAG laser is considered particularly advantageous for certain embodiments of the subject invention since with the fourth harmonic of this laser at 266 nm it is possible to excite only the Eu dopant ion, while the third harmonic of the laser at 355 nm may be employed to excited only the Dy dopant ion. By employing both excitation lines, it is possible to excite both the Dy and Eu ions and to utilize ratios of the various fluorescent lines in order to carry out temperature measurements over a wide temperature range. It should be noted that the 351 nm output of a XeF laser can be utilized to excite the dysprosium ion in the $LuPO_4$ host material. Light emitted from the pulsed laser for the purpose of exciting fluorescence form one or both of the dopant ions is directed on the thermophosphor material by means of a beam-splitting mirror or by other means evident to those skilled in the art. It should be noted that the excitation of the thermophosphor is not limited to excitation by a laser, but that for some applications, other excitation sources may be employed such as an ultraviolet lamp. When suitably excited, the thermophosphor emits a series of spectral lines which are due to the presence of the Dy and Eu dopants. The temperature of the system may be determined by comparing the ratio of selected emission lines from the two dopants. The stimulated luminescence emitted from the thermophosphor is then directed to a beam-splitting dichroic mirror by a concave optical lens and can be focused by a lens onto a fiber optic device or directly into an optical train designed to convey the light either to a spectrometer or through a suitable interference filter or a narrow band optical filter to photomultiplier or photodiode detector. In one embodiment of the invention, the fluorescence emitted from the thermophosphor is directed to a spectrometer which is used to analyze the spectral properties (i.e. emitted wavelength and line widths) of the emission. The output of the spectrometer is detected by the photomultiplier tube or photodiode, and this signal can then be displayed and stored using a digital oscilloscope whose output can be coupled to a variety of external computers for data storage and processing.

In alternate embodiments of the invention, the output signal can be used in a servo-feedback configuration to either control or program processing and synthesis temperatures and temperature cycles. For example, in one embodiment of the invention, the thermophosphor and associated apparatus could be used to measure the temperature of a ceramic work piece located inside a microwave heating system. The detected thermophosphor signal which is proportional to the work piece temperature could then be compared with a set-point signal and the resulting output can be used as a control signal for the purpose of regulating the microwave output power and, thereby, either stabilizing the processing temperature of the ceramic workpiece at a selected value, or by changing the set point in a controlled manner, programming a desired temperature processing cycle.

Figure 2:
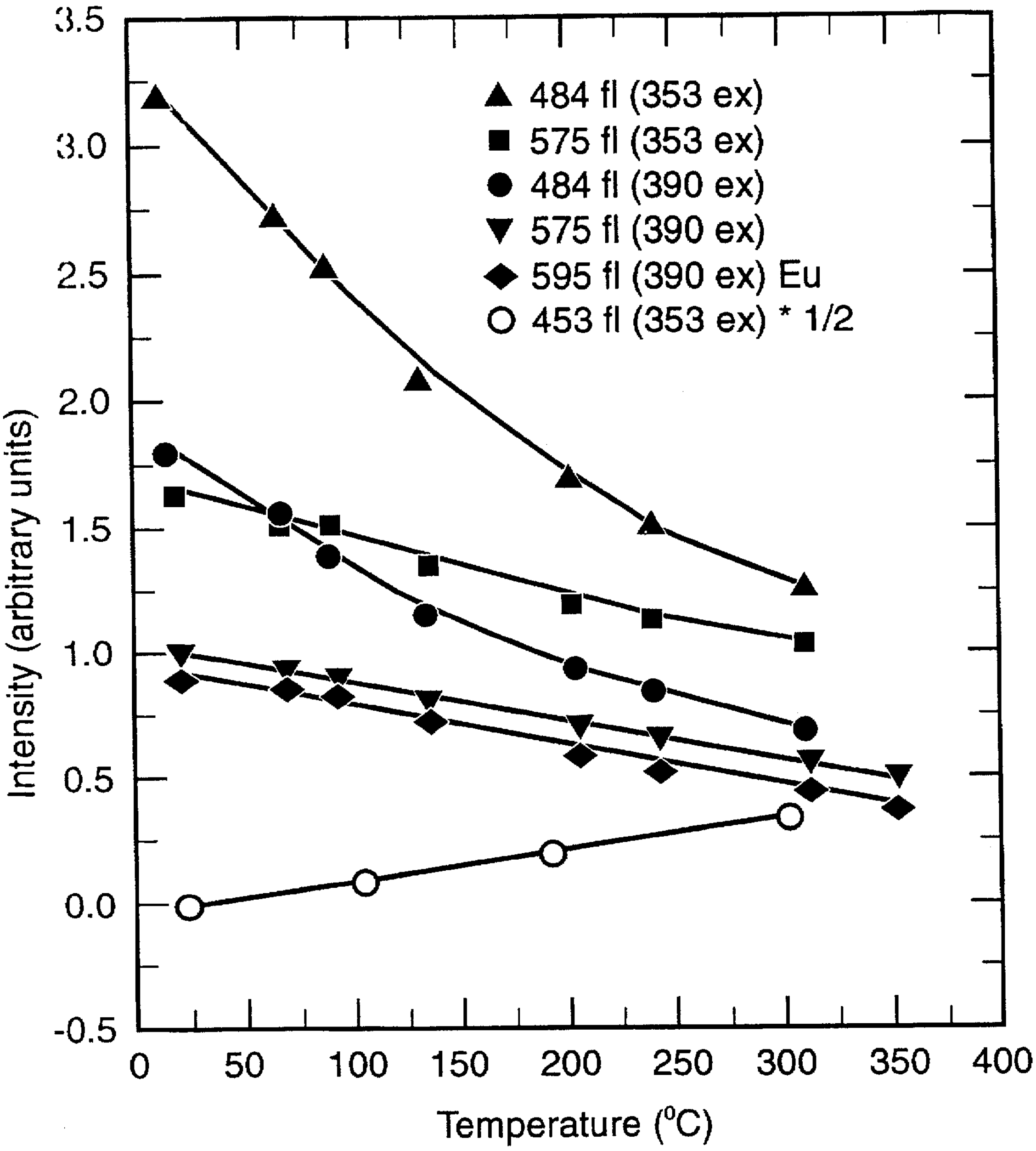
FIG. 2 is a graph illustrating the relative intensity versus temperature for several spectral lines for the $LuPO_4$:Dy (1%), Eu(2%) phosphor in accordance with the present invention.

Shown in FIG. 2 are curves generated from the data of the relative intensity versus temperature for several of the pertinent spectral lines (fl, fluorescence; ex, excitation) for the $LuPO_4$:Dy(1 at. %), Eu(2 at. %) phosphor sample. The line strengths were plotted as a function of temperature. The 484-nm Dy line strength is found to change rather rapidly as a function of temperature. The 575-nm Dy line and the 595-nm Eu line ($^5D_0$–$^7F_1$) both appear to change (though less dramatically) in the temperature range measured. The reason for this difference in response to excitation wavelength is not known. For the Dy emissions at 484 and 575 nm, a decrease of a few percent over this range would be expected if thermalization were the only mechanism. However, a 30–50% decrease was observed. Thus other factors appear to be important. In any case, it is known that the europium line strength is sufficient to produce measurable fluorescence up to temperatures of at least 1200° C. We have obtained measurable fluorescence to 1350° C. from the Dy dopants in orthophosphate host crystals. Hence the ratio of the various lines from the doubly doped $LuPO_4$ host of this invention can, in fact, be used to measure temperatures photo-optically over a very wide and practical temperature range, such as from about 350° C. to about 1350° C.

In another embodiment of the subject invention, the $LuPO_4$:Dy,Eu thermophosphor can be attached to a moving part. Again, the thermophosphor may be in the form of a single crystal, polycrystalline powder-plus-adhesive to form a coating, or a sintered ceramic. The luminescent signal can then be excited by means of a laser that is located at a remote location with respect to the heated moving component. An appropriately design optical collection system will then collect the stimulated emission from the calibrated $LuPO_4$ thermophosphor and, depending on the range of the operating temperature of the moving part, either the Dy or Eu luminescence or ratios of the two types of luminescence can be used to determine the temperature with the part in motion. This mode of operation is possible since optical signals are used first to stimulate the fluorescence output of the thermophosphor and subsequently to interrogate the phosphor, and no mechanical or electrical contacts are required between the stimulation source and the fluorescence detection system.

The present invention can be used to carry out temperature measurements in environments where the use of metallic conductors (e.g. thermocouples) presents a number of practical problems. Such environments include, in particular, furnaces in which microwave heating is employed. Microwave fields can couple directly to resistive thermometers or to thermocouples which are not adequately shielded or properly placed in the microwave system. The present invention circumvents such problems entirely since the temperature measurements are carried out through optical means which do not involve any physical contact with the sample or any electrical connections to the work piece. Additionally, the invention has the potential for remotely making temperature measurements in high radiation environments, and the output of the subject sensor is amenable to transmission through optical fibers or through single-crystal fibers of, for example $Al_2O_3$. The subject invention may be utilized in making heat flux measurements or in the control of densification processes in ceramics. Due to its ability to remotely measure temperatures and to measure temperatures on moving parts in the high temperature regime, it is anticipated that the invention will find wide spread use in a variety of industrial, scientific, and military applications.

It is anticipated that the present invention can be used in temperature measurements in a variety of systems for the production, conversion, and conservation of energy including various heat engines, turbines, reciprocating engines, reactors, electrical power generators, and potentially in combustion reactions. As noted above, the subject invention is particularly well suited to applications involving temperature measurements in microwave heated furnaces which are used for materials sintering, processing, and synthesis.

There are several thermally sensitive phosphor materials that have been previously identified for use at high temperatures above 600° C. These are yttrium oxide doped with europium and yttrium aluminum garnet doped with either dysprosium, samarium, terbium or europium (i.e., YAG:Dy, YAG:Sm, YAG:Tb, YAG:Eu). However, none of these systems employ the remote measurement of temperature by utilizing the ratio of the fluroescence emission of the double dopents dysprosium and europium in the lutetium phosphate phosphor of the present invention.

While there has been shown and described what is at present considered the preferred embodiments of the invention, it will be obvious to those skilled in the art that various changes and modifications may be made therein without departing from the scope of the invention as defined by the appended claims.

What is claimed is:

1. A high temperature measuring system comprising: a lutetium phosphate dysprosium and europium-activated phosphor having a phosphor fluorescence emission comprising a dysprosium fluorescence emission and an europium fluorescence emission, a phosphor excitation means having an excitation emission for exciting the phosphor to produce the phosphor fluorescence emission, an optical focusing means for focusing the phosphor fluorescence emission to a phosphor fluorescence emission separation means, said phosphor fluorescence emission separation means separates said dysprosium fluorescence emission contained in said phosphor fluorescence emission from said europium fluorescence emission contained in said phosphor fluorescence emission to form a separated dysprosium fluorescence emission and a sepafluorescence emifluorescence emission, a first filter for filtering said separated europium fluorescence emission to form a filtered separated europium fluorescence emission, a second filter for filtering said separated dysprosium fluorescence emission to form a filtered separated dysprosium fluorescence emission, a first detection means for detecting the intensity of said filtered separated europium fluorescence emission, a second detection means for detecting the intensity of said filtered separated dysprosium fluorescence emission, an analyzing means, a first electrical connecting means and a second electrical connecting means, said analyzing means being in electrical communication with said first detection means and said second detection means by said first and second electrical connecting means, respectively, said excitation emission of said phosphor excitation means being in optical communication with said lutetium phosphate, dysprosium and europium-activated phosphor, said phosphor fluorescence emission being in optical communication with said optical focusing means, said focused phosphor fluorescence emission being in optical communication with said phosphor fluorescence emission separation means, said separated europium fluorescence emission being in optical communication with said first filtering means, said separated dysprosium fluorescence emission being in optical communication with said second filtering means, said filtered separated europium fluorescence emission being in optical communication with said first detection means and said filtered separated dysprosium fluorescence emission being in optical communication with the second detection means.

2. A high temperature measuring system in accordance with claim 1 wherein said phosphor excitation means is a laser.

3. A high temperature measuring system in accordance with claim 1 wherein said phosphor excitation means is a UV source.

4. A high temperature measuring system in accordance with claim 1 wherein said optical focusing means is selected from the group consisting of a lens, a focusing mirror and combinations thereof.

5. A high temperature measuring system in accordance with claim 1 wherein said phosphor fluorescence separation means is a dichroic beam-splitting mirror.

6. A high temperature measuring system in accordance with claim 1 wherein said first filter and said second filter are selected from the group consisting of a narrow band optical filter, a prism monochromator, a grating monochromator, an interference optical filter and combinations thereof.

7. A high temperature measuring system in accordance with claim 1 wherein said first detection means and said second detection means are photomultipliers.

8. A high temperature measuring system in accordance with claim 1 wherein said first detection means and said second detection means are photodiode detectors.

9. A high temperature measuring system in accordance with claim 1 wherein said analyzing means is a digital oscilloscope coupled to a computer.

10. A method for measuring a temperature of an article comprising the following steps:

step 1. providing a coated article coated with a lutetium phosphate, dysprosium and europium-activated phosphor, said coated article having a temperature;

step 2. exciting said lutetium phosphate, dysprosium and europium-activated phosphor with a phosphor excitation means causing said lutetium phosphate, dysprosium and europium-activated phosphor to fluoresce a phosphor fluorescence emission comprising a dysprosium fluorescence emission and an europium fluorescence emission;

step 3. optically focus said phosphor fluorescence emission by an optical focusing means, said phosphor fluorescence emission being in optical communication with a phosphor fluorescence emission separation means;

step 4. separating said dysprosium fluorescence emission and said europium fluorescence emission of said phosphor fluorescence emission by said phosphor fluorescence emission separation means forming a separate dysprosium fluorescence emission having a wavelength and an intensity and a separate europium fluorescence emission having a wavelength and an intensity;

step 5. filtering said separate dysprosium fluorescence emission with a first filtering means and filtering said separate europium fluorescence emission with a second filtering means forming a filtered separate dysprosium fluorescence emission and a filtered separate europium fluorescence emission, said filtered separate dysprosium fluorescence emission having an intensity and said filtered separate europium fluorescence emission having an intensity;

step 6. detecting said intensity of said filtered separated dysprosium fluorescence emission with a first detection means and detecting said intensity of said filtered europium fluorescence emission with a second detection means;

step 7. calculating a ratio of said intensity of said filtered separate dysprosium fluorescence emission and said intensity of said filtered separate europium fluorescence emission with an analyzer means; and step 8. determining said temperature of said article from said ratio of said intensity of said filtered separate dysprosium fluorescence emission and said intensity of said filtered separate europium fluorescence emission with said analyzer means.

* * * * *